(12) United States Patent
Scotson et al.

(10) Patent No.: US 6,958,599 B2
(45) Date of Patent: Oct. 25, 2005

(54) ANGULAR VELOCITY SENSOR

(75) Inventors: Peter Geoffrey Scotson, Worcester (GB); Christopher David Dixon, Finham (GB); Connel Williams, Leamington Spa (GB)

(73) Assignee: Lucas Industries Limited (GB)

(*) Notice: Subject to any disclaimer, the term of this patent is extended or adjusted under 35 U.S.C. 154(b) by 0 days.

(21) Appl. No.: 10/863,005

(22) Filed: Jun. 8, 2004

(65) Prior Publication Data

US 2004/0251894 A1 Dec. 16, 2004

Related U.S. Application Data

(63) Continuation of application No. PCT/GB02/05587, filed on Dec. 9, 2002.

(30) Foreign Application Priority Data

Dec. 8, 2001 (GB) .................................. 0129446

(51) Int. Cl.$^7$ ................................. G01B 7/30
(52) U.S. Cl. ............... 324/174; 324/207.2; 324/207.25; 324/179; 324/207.12
(58) Field of Search ........................ 324/207.12, 207.2, 324/207.21, 207.25, 166–179

(56) References Cited

U.S. PATENT DOCUMENTS

| 4,908,572 A | * | 3/1990 | Sakai et al. ................. 324/173 |
| 5,313,159 A | * | 5/1994 | Allwine, Jr. ............. 324/207.2 |
| 5,977,764 A | * | 11/1999 | Riedle et al. ................ 324/165 |

FOREIGN PATENT DOCUMENTS

| DE | 197 47 918 | 3/1999 |
| DE | 199 49 106 | 5/2001 |
| EP | 0 902 292 | 3/1999 |
| WO | 00 08475 | 2/2000 |

* cited by examiner

Primary Examiner—Jay Patidar
(74) Attorney, Agent, or Firm—MacMillan, Sobanski & Todd, LLC

(57) ABSTRACT

An angular velocity sensor for a rotor (2) and method of determining angular velocity in which the position at which event generation means (4) pass sensing means (5) is determined using information from the times at which the event generation means (4) passed the sensing means (5) during at least one previous complete revolution to of the rotor (2). Especially applicable to use of Hall Effect Sensors to detect commutation points of a brushless permanent magnet rotor in an Electric Power Assisted Steering apparatus.

19 Claims, 2 Drawing Sheets

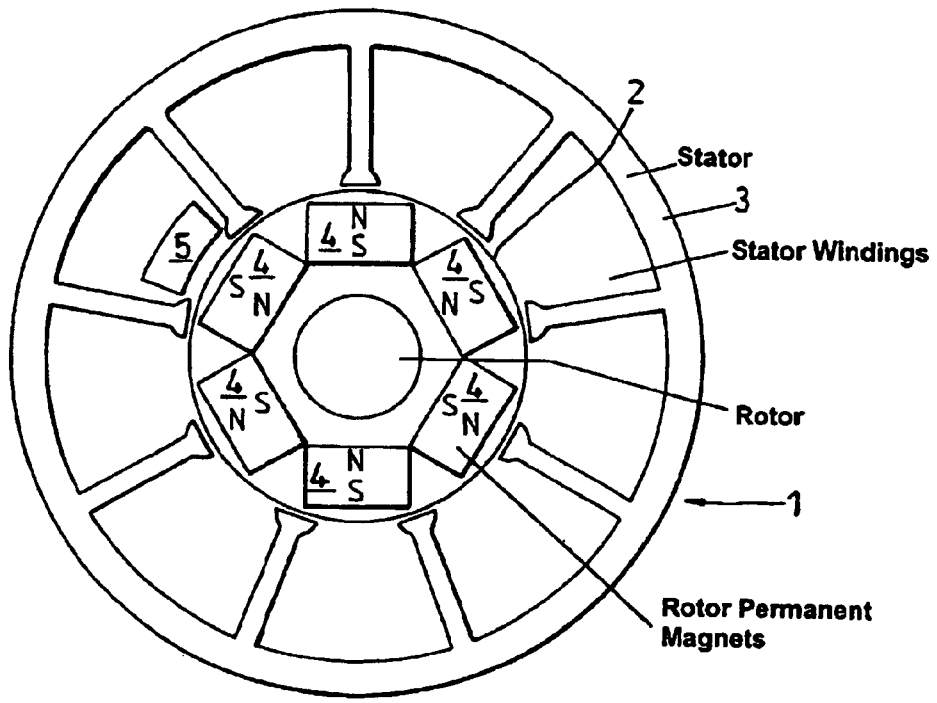
Fig. 1
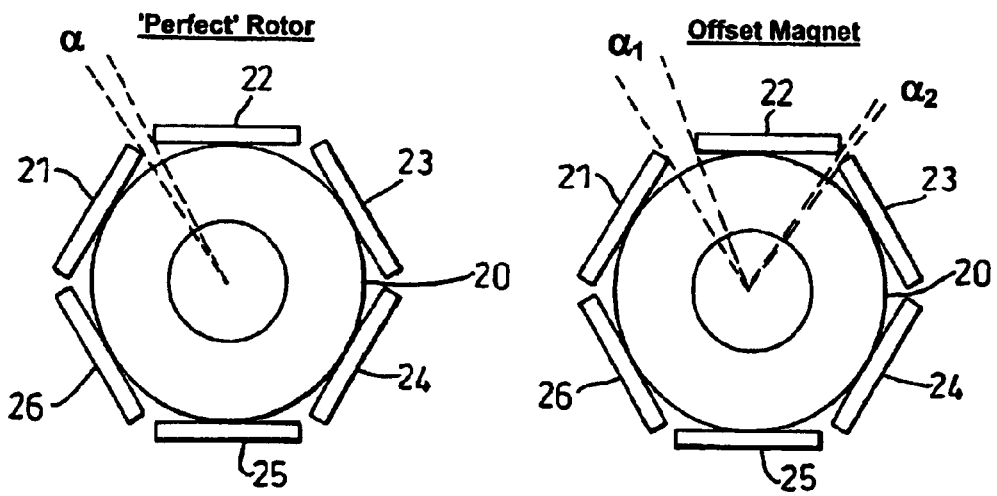
Fig. 2(a)      Fig. 2(b)

ANGULAR VELOCITY SENSOR

CROSS REFERENCE TO RELATED APPLICATIONS

This application is a continuation of International Application No. PCT/GB02/05587 filed Dec. 9, 2002, the disclosures of which are incorporated herein by reference, and which claimed priority to Great Britain Patent Application No. 0129446.1 filed Dec. 8, 2001, the disclosures of which are incorporated herein by reference.

BACKGROUND OF THE INVENTION

This invention relates to improvements in angular velocity sensors, and in particular to an angular velocity sensor suitable for determining the angular position of the rotor in an electrical motor. It also relates to a method of determining the angular velocity of a rotor.

In this description the term "rotor" has been used to describe a device or element which is free to rotate about an axis. It may commonly comprise the rotor of an electric motor and indeed the invention primarily arose from work into monitoring the angular position of rotors in motors for subsequent use in a motor control strategy. However, it is to be understood that the term is not to be construed in the narrow sense and should instead be given a broader interpretation which includes—amongst other things—steering shafts for vehicle steering systems.

To measure the angular position of a rotor a wide variety of angular position sensors have been developed. The most common way of determining the angular velocity of a rotor is to provide a sensor, which determines the elapsed time taken for a fixed position on the rotor to make a complete revolution. The faster the rotor is spinning the shorter the elapsed time taken for the fixed point to pass the sensor and complete a revolution before passing the sensor again.

A problem with sensing the passing of a fixed point on a rotor is that a velocity value is only produced once for each complete revolution. If the rotor is turning relatively slowly the update time for the velocity value may be too long for accurate measurements to be obtained. To improve on the response time of the sensor it is therefore common to provide a number of different fixed points equally spaced around the rotor. For example, four points at 90 degrees spacing may be provided. In this case a velocity signal can be generated when the rotor has passed through a quarter of a revolution.

An example of a widely used angular velocity sensor which produces more than one output for each revolution of the rotor is the use of a Hall effect sensing device to detect the passing of the poles of the magnets of an electric motor.

The state of the Hall effect sensors changes whenever a magnet edge passes the sensing region of the elements. Thus, the passing of the rotor magnets defines the fixed measurement points used by the sensor. As more than one magnet is used then more than one fixed point is provided within each revolution.

A problem common to any system in which a number of fixed points are detected as a rotor rotates arises due to inaccuracies in the positioning of the fixed points. In a simple system the fixed points are arranged at equal angular spaced positions as illustrated in FIG. 2($a$) of the accompanying drawings. Six magnets 21,22,23,24,25,26 are spaced at equal angles $\alpha$ around a rotor 20.

If the angular spacing is known then the velocity is readily determined by measuring the elapsed time between adjacent fixed points passing the sensor. However, if the fixed points are not accurately positioned the spacing between adjacent points will vary and so the velocity determined simply from the elapsed time will also seem to vary even if the rotor is rotating at a constant speed. This is illustrated in FIG. 2($b$) of the accompanying drawings. The spacing $\alpha_1$ and $\alpha_2$ between two pairs of the magnets 21,22 and 22,23 is clearly unequal.

We have found that the exact angular position of the magnets of a practical rotor will be uncertain due to manufacturing tolerances and constraints associated with the attachment of the magnets to the rotor. This will cause the transitions between magnets to occur slightly before or after the expected angular transition point as the rotor is rotated. This misalignment is often random and cannot be predicted.

The problem of misalignment does not occur when only one fixed point is provided, as there will always be a complete revolution occurring between each sensing of the fixed point. For this reason, prior art velocity techniques have relied upon measurement over a complete revolution where high accuracy is needed or have simply tolerated the errors that occur due to misalignment.

SUMMARY OF THE INVENTION

An object of the present invention is to provide an angular position sensor, which overcomes the problems associated with misalignment of the fixed points on a rotor. A further object of the present invention is to provide a method of monitoring the angular position of a rotor which is at least partially free from the problems associated with incorrect alignment of fixed sensing points such as rotor magnets described hereinbefore.

In accordance with a first aspect the invention provides an angular velocity sensor for detecting the angular velocity of a rotor, the sensor comprising:

at least two event generating means located at angularly spaced positions around the rotor;

angular position sensing means which is adapted to produce a plurality of temporally spaced events as the rotor is rotated about its axis relative to the sensing means, each event occurring as a respective event generating means passes the sensing means, event time measurement means adapted to record the time at which the respective sensed events occur;

event position determining means adapted to determine the angular position of the rotor at the time the events occur;

and velocity determining means adapted to determine the average velocity of the rotor between two temporally spaced events based upon the measured times at which the events occur and the determined angular position of the rotor when the events occur, characterised in that the event position determining means determines the relative angular position of the two event generating means from information previously obtained from the event time measurement means during at least one previous complete revolution of the rotor.

The invention thus provides apparatus in which information obtained from measurements of the times at which events occurred during a previous revolution of the rotor is used to determine the relative angular positions of the event generating means. This allows the apparatus automatically to be insensitive to the misalignment errors that can occur where two or more event generating means are spaced around a rotor. Instead of assuming that the events occur at "ideal" fixed locations, the apparatus actually determines where the event generating means are located to allow an accurate velocity value to be determined.

The event position determining means may be adapted to determine the relative angular positions of the event generation means from measurements obtained during an initial testing operation of the apparatus.

The determined position values may be stored in a memory for subsequent use by the apparatus. Alternatively, the event position determining means may update the values at regular intervals during operation of the rotor or perhaps even continuously. They may be updated whenever the sensor is started up after each period in which it has been laid dormant.

The event position determining means may comprise:

first means for determining the elapsed time taken for the rotor to complete a full revolution, second means for determining the average velocity over the complete revolution from the elapsed time, third means for determining the elapsed time between two events that occurred during the complete revolution, and fourth means for determining the displacement of the rotor between the two events based upon the average velocity from the second means and the elapsed time from the third means.

Because the average velocity is taken for a full revolution it can be calculated with high accuracy since it is free from any misalignment errors of the event generating means. This is then used with the time measurements for the two events within the revolution to determine their relative positions.

It is possible to use the average velocity obtained over a complete revolution to determine the angular displacement between every pair of temporally adjacent events that occurred in that revolution. However, such an approach is not preferred.

Consider that the rotor is in a steady state of constant velocity, steady deceleration or steady acceleration over the measured complete revolution. In all three cases the average velocity over the complete revolution will provide an accurate measurement of the average velocity of the rotor at the instant at which the rotor is halfway through the revolution. At other points within the revolution it will be inaccurate unless the rotor is operating at a constant velocity.

In view of this we have appreciated that the average velocity should only be used when determining the relative angular positions of events that occur at or around the half way point through the revolution.

The apparatus may therefore determine a set of average velocity values, each one corresponding to a full revolution that starts at the time of a different event, and employ this average to determine the relative position of those events at or around half a revolution earlier in the complete revolution.

It will therefore be appreciated that it is not essential that the angular position of every pair of events is determined from information obtained during a single revolution of the rotor. Timings may be taken for a first pair of events during one revolution to determine the relative angular positions. Timings may also be taken some time later from a different revolution to determine the relative angular position of a different pair of events.

In many cases, the ideal position of each of the event generating means will be known. They will typically be uniformly spaced around the rotor. In this case, instead of storing values indicative of the actual relative positions of the event generating means a set of error correction values may be stored representing the amount that each event generating means deviates from its ideal position.

The error correction value may be stored in the memory as well as or instead of the determined angular position values. An error correction value may be determined for, and stored for, each event over a complete revolution of the rotor.

To determine the error correction values it is essential for the apparatus to store in the memory a set of ideal angular position values for each event that occurs over a revolution. This may comprise a set of data values, or a stored function from which the ideal position can be determined. For example, the number of events per revolution and their ideal angular spacing may be stored in the memory.

In effect, the storage means will contain a set of error values, or actual angular position values, for each event that occurs as the rotor rotates. Thus, whenever an event occurs the error can be taken into account to indicate the correct angular position of the rotor at the time the event occurred.

The event generating means may comprise magnets spaced around the rotor and the sensing means may comprise one or more, and preferably three, electromagnetic sensors. Suitable sensors are those which use the Hall effect to detect the passing of the poles of a magnet.

The time measurement means may comprise a counter. The counter may to be triggered whenever an event occurs and be stopped whenever a subsequent event occurs. The total count between events will provide an indication of the time between events. Of course, many other devices for measuring the elapsed time between temporally spaced events are possible.

In accordance with a second aspect the invention provides a method of determining the angular positions of at least two event generating means located at angularly spaced positions around a rotor, the method comprising the steps of:

producing a plurality of temporally spaced events as the rotor is rotated about its axis relative to a sensing means, each event occurring as a respective event generating means passes the sensing means over a complete revolution, recording the time at which the respective sensed events occur;

determining the time taken for the rotor to rotate through the complete revolution, determining the average velocity of the rotor across the complete revolution from the elapsed time for the complete revolution; and determining the relative angular position of the two event generating means from the determined average velocity for the complete revolution and the elapsed time between the measurements of the two events within that complete revolution.

The method therefore combines elapsed time measurements for two events within a revolution with an average determined across a complete revolution to determine the actual positions at which the events occurred.

The time taken to complete a revolution may be determined by measuring the elapsed time taken for one of the event generating means to generate two temporally spaced events.

Each event generating means may produce a unique identifiable event allowing it to be uniquely identified to do this. Alternatively, if the total number of event generating means is known the passing of a complete revolution may be determined by counting the number of events that have occurred.

The method may comprise determining a set of average velocity values, each one corresponding to a full revolution of the rotor that starts at the time of a respective event, with each average being used to determine the relative displacement between events that occur at or around half a revolution earlier in the respective complete revolution from which the average velocity was obtained.

Whilst the method can be used with only two event generating means it is suitable for use with many more than two. In practice, for n event generating means there will be n relative angular positions to determine. This can be achieved using the method of the present invention by measuring the time for a complete revolution starting with event n=m (for m=1 to n), determining the average velocity of the rotor over that complete revolution, and combining this average velocity with the elapsed time between events occurring approximately halfway through that revolution (i.e. n=m/2). This provides the greatest accuracy. However, if it can be determined that the rotor rotated at a steady constant velocity throughout its revolution then a single average value can be reliably used to determine the relative position of every event in that revolution.

The method may comprise storing a rolling set of n timing values from the n event generating means. Thus, at the instant of any event occurring the times of the n previous events will be stored in the buffer.

The method may then comprise determining the total elapsed time taken for a complete revolution up to the instant of the current event by adding together the total times held in the buffer for the n previous events. The average velocity for a revolution may be determined from this elapsed time.

Finally, the method may comprise determining the elapsed time between two events at or around the centre of rolling set of values and combining this elapsed time with the average velocity to determine the angular displacement of the rotor between the two events and hence their relative angular positions. This may be stored in a memory.

The method may be repeated for each event time an event occurs over a full revolution until a full set of n relative position values are stored.

Once the full set of position values is stored the method may be stopped or may be continuously updated as the rotor turns.

Having stored the full set of position values they may be used to determine the velocity of the rotor by monitoring the time at which events occur, identifying which events have occurred, determining the displacement of the rotor between the events from the stored values, and dividing the displacement by the elapsed time to determine the velocity.

In accordance with a third aspect the invention provides a method of determining the angular velocity of a rotor comprising the initial steps of determining the position of a plurality event generating means spared around the rotor using the method of the second aspect of the invention, and subsequently measuring the elapsed time between events together with the angular position at which the event occurred to determine the velocity of the rotor.

Other advantages of this invention will become apparent to those skilled in the art from the following detailed description of the preferred embodiment, when read in light of the accompanying drawings.

BRIEF DESCRIPTION OF THE DRAWINGS

FIG. 1 is cross sectional view of a motor which is monitored by a velocity sensor in accordance with a first aspect of the invention;

FIG. 2(a) is a cross-sectional view of a rotor having perfectly spaced rotor magnets and 2(b) illustrates the same rotor having imperfectly aligned rotor magnets;

DETAILED DESCRIPTION OF THE INVENTION

Figure 3:
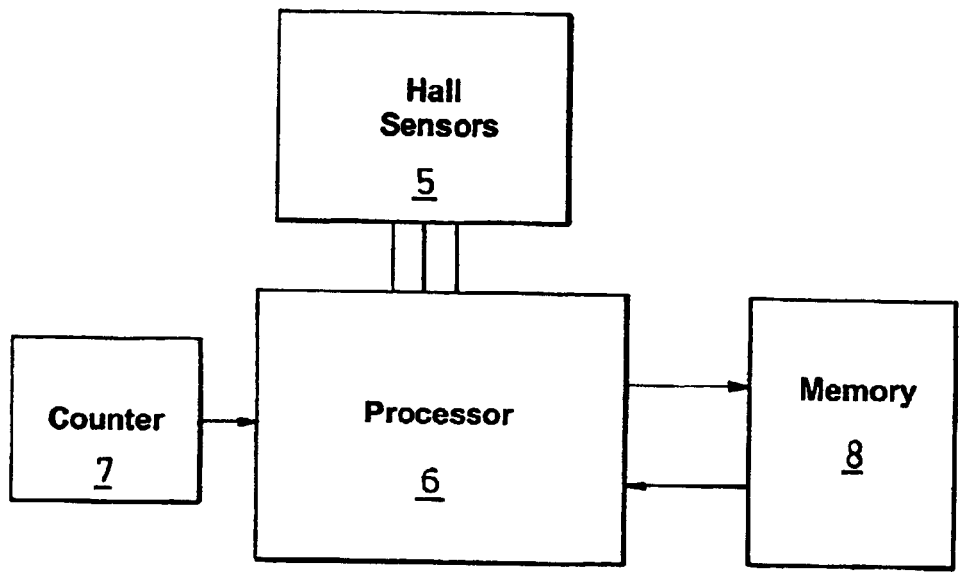
FIG. 3 is a schematic of the sensor of the present invention.

The angular velocity sensor illustrated by way of example in the accompanying drawings is especially suited to the monitoring of the angular position of an electric motor illustrated in FIG. 1. The motor 1 comprises a 3-phase star-connected brushless permanent magnet (PM) configuration. Its electromagnetic design includes a 6-pole permanent magnet rotor 2 and 9-slot copper-wound stator 3. The six magnets 4 are generally evenly spaced around the rotor. As the rotor 1 rotates through one complete mechanical revolution there are six PM north-south pole transitions seen at any point on the stator.

A Hall Effect Array 5 is secured to the stator which comprises three electromagnetic sensors (not shown) spaced around the rotor at 40 degree mechanical spacing. Each sensor can adopt one of two polarisation states as the north and south poles of magnets on the rotor pass by. Each of the Hall effect sensors changes from one state to another as the motor rotates. The pattern of the sensor output can adopt six different states to indicate the electrical position of the motor as illustrated in FIG. 2 of the accompanying drawings. It is notable that the pattern repeats three times within each complete mechanical revolution of the rotor for the type of motor illustrated in FIG. 1 of the accompanying drawings, giving a total of 18 transitions of "events" per revolution.

The output of the sensing means 5 is passed to a processor 6 as shown in FIG. 3 of the accompanying drawings. The processor 6 also receives a count signal from a timer 7. Each time an event occurs in the output of the Hall effect sensors 5 it is passed to the processor. The processor records the number of the event (from n=1 to 18) which is stored in an area of electronic memory 8 associated with the processor 6. The time at which the event occurred (from t1 to t18) is also stored in the memory in a rolling buffer.

Figure 4:
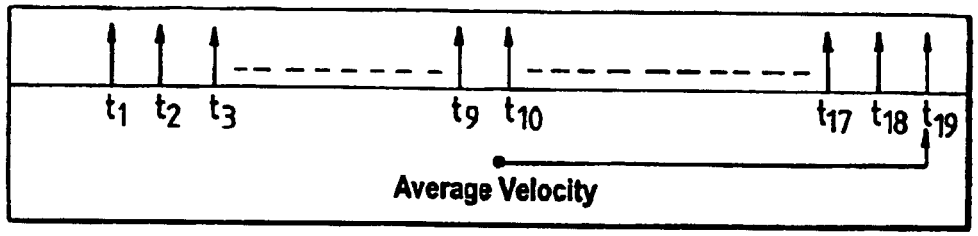
FIG. 4 illustrates the contents of the rolling buffer in the memory of the sensor after a complete revolution.

After a complete revolution a total of an array of 18 events and their associated time values are stored in a buffer held in the memory. This is illustrated in FIG. 4 of the accompanying drawings.

Once the buffer is full, as the last event is entered in the buffer, the processor determines the total time for a complete revolution by summing all the times held in the rolling buffer.

From the average time for a revolution the average velocity (degrees per second) of the rotor during the revolution is determined by dividing the time (in seconds) by the angle (360 degrees).

At a constant velocity the average velocity could be used to determine the angular displacement between each adjacent event in the buffer by multiplying the elapsed time between events by the average velocity. However, if the motor is accelerating or decelerating the average velocity not be correct for all the transition points.

To improve the accuracy of the offset values it is presumed that the motor is constantly decelerating or accelerating or rotating at a steady velocity. If this assumption is made then the average velocity value will be correct for use in determining the offset values for a transition half a revolution earlier. It is therefore at this point that we calculate the offset error.

For example, when the full set of 18 times has been calculated the average velocity over the whole set is calculated. This is then used to determine the angular displacement between the 9$^{th}$ and 10$^{th}$ events. This displacement is stored in the memory as illustrated in FIG. 4.

Figure 5:
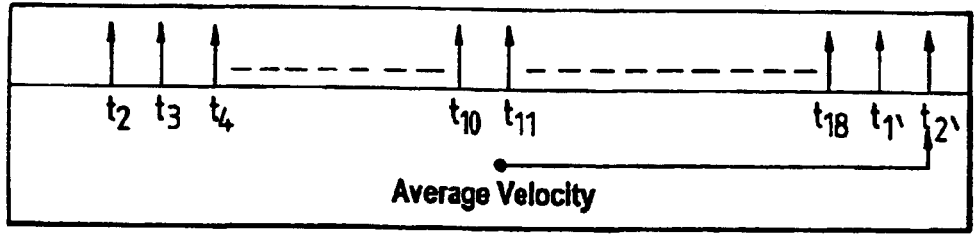
FIG. 5 shows how the contents of the buffer shown in FIG. 4 changes as the next event occurs.

As the next event is received (event n=2 for the second revolution) the time of the first event is pushed out of the rolling buffer and the new event entered as shown in FIG. 5. The average velocity of the revolution indicated by the new buffer contents is again calculated. This time the average is used to determine the displacement between the 10$^{th}$ and 11$^{th}$ events. This is also stored in the memory. This is shown in FIG. 5.

The process of measurement is continued 18 times until the angular displacements between all adjacent pairs of events are stored in the memory. This provides a measure of the relative angular position of each event.

Once the complete set of offset error values is determined they are used during subsequent operation of the sensor to determine the exact angular velocity of the rotor. The time between two events is determined and the angular position at which the events actually occurred is found by identifying the events. The velocity can then be directly found by combing the displacement between events with the elapsed time between events.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An angular velocity sensor for detecting the an angular velocity of a rotor having an axis, the sensor comprising:
   at least two event generating means located at angularly spaced positions around the rotor;
   an angular position sensing means that is operative to produce a plurality of temporally spaced events as the rotor is rotated about its axis relative to said angular position sensing means, each event occurring as a respective event generating means passes said angular position sensing means,
   an event time measurement means that is operative to record the time at which said respective sensed temporally spaced events occur;
   an event position determining means including:
      a first means for determining an elapsed time taken for said rotor to complete a full revolution,
      a second means for determining the average velocity over said complete revolution from said elapsed time,
      a third means for determining the elapsed time between two events that occurred during said complete revolution, and
      a fourth means for determining the displacement of said rotor between said two events based upon said average velocity from said second means and said elapsed time from said third means;
   said event position determining means being operative to determine the angular position of the rotor at the time said events occur and to determine the relative angular position of said at least two event generating means from information previously obtained from said event time measurement means during at least one previous complete revolution of the rotor; and
   a velocity determining means that is operative to determine the average velocity of the rotor between two temporally spaced events based upon the measured times at which said events occur and the determined angular position of the rotor when said events occur, said velocity determining means further operative to determine a set of average velocity values with each of said average velocity values corresponding to a full revolution of the rotor and starting at the time of a different event with said event positioning means using said set of average velocity values to determine a relative position of those events that occur around half a revolution earlier in said corresponding full revolution.

2. The angular velocity sensor of claim 1 wherein said event position determining means is further operable to determine the relative angular positions of said event generation means from measurements obtained during an initial testing operation of the sensor.

3. The angular velocity sensor of claim 1 wherein said event position determining means updates the relative angular positions of said event generation means at regular intervals during operation of the rotor.

4. The angular velocity sensor of claim 1 wherein timings are taken for a first pair of events during one revolution to determine the relative angular positions of said first pair of events and some time later from a different revolution to determine the relative angular position of a second pair of events.

5. The angular velocity sensor of claim 1 wherein the sensor includes a memory device and a set of error correction values are stored in said memory device, said error correction values representing the amount that each event generating means deviates from its ideal position.

6. The angular velocity sensor of claim 5 wherein said determined angular position values are also stored in said memory device.

7. The angular velocity sensor of claim 6 wherein a set of ideal angular position values for each event that occurs over a revolution are also stored in said memory device.

8. The angular velocity sensor of claim 1 wherein said event generating means includes magnets spaced around said rotor and said sensing means includes at least one electromagnetic sensor.

9. A method of determining the angular positions of at least two event generating means located at angularly spaced positions around a rotor, the method comprising the steps of:
   (a) producing a plurality of temporally spaced events as the rotor is rotated about its axis relative to a sensing means, each event occurring as a respective event generating means passes the sensing means over a complete revolution;
   (b) recording the time at which the respective sensed events occur;
   (e) determining the time taken for the rotor to rotate through a complete revolution for each of the sensed events;
   (d) using the elapsed times from step (c) for each complete revolution to determine a set of average velocity values, each one of the average velocity values corresponding to a full revolution of the rotor that starts at the time of a respective event;
   (e) using each average velocity value to determine a plurality of relative displacements between events that occur about half a revolution earlier in the respective complete revolution from which the average velocity was obtained; and
   (f) determining the relative angular position of the two event generating means from the relative displacements determined in step (e) that correspond to the two event generating means.

10. The method of claim 9 wherein, during step (c), the time taken to complete a revolution is determined by measuring the elapsed time taken for one of the event generating means to generate two temporally spaced events.

11. The method of claim 9 wherein, during step (a), each event generating means produces a uniquely identifiable event allowing it to be uniquely identified.

12. The method of claim 9 wherein, during step (c), the passing of a complete revolution is determined by counting the number of events that have occurred, the total number of events generating means being known.

13. The method of claim 9 wherein, if it is determined that the rotor is rotating at a steady constant velocity throughout a revolution, then, during step (e), a single average value is used to determine the relative position of every event in that revolution.

14. The method of claim 9 wherein the method further includes a step of storing a rolling set of n dining values from n event generating means.

15. The method of claim 14 wherein said method further includes a step of determining the total elapsed nine taken for a complete revolution up to the instant of the current event, and hence the average velocity, by adding together the times for the n previous events.

16. The method of claim 15 wherein the method further comprises determining the elapsed time between two events around the center of a rolling set of values and combining this elapsed time with the average velocity to determine the angular displacement of the rotor between the two events and hence their relative angular positions.

17. The method of claim 14 wherein the method is repeated each time an event occurs over a full revolution until a full set of n relative position values are stored.

18. The method of claim 17 wherein the full set of position values are used to determine the velocity of the rotor by monitoring the time at which events occur, identifying which events have occurred, determining the displacement of the rotor between the events from the stored values, and dividing the displacement by the elapsed time to determine the velocity.

19. A method of determining the angular velocity of a rotor having at least two event generating means located at angularly spaced positions about the rotor, the method comprising the steps of:

(a) producing a plurality of temporally spaced events as the rotor is rotated about its axis relative to a sensing means, each event occurring as a respective event generating means passes the sensing means over a complete revolution;

(b) recording the time at which the respective sensed events occur;

(c) determining the time taken for the rotor to rotate through a complete revolution for each of the sensed events;

(d) using the elapsed times from step (C) for each complete revolution to determine a set of average velocity values, each one of the average velocity values corresponding to a full revolution of the rotor that starts at the time of a respective event;

(e) using each average velocity value to determine a plurality of relative displacements between events that occur about half a revolution earlier in the respective complete revolution from which the average velocity was obtained;

(f) determining the relative angular position of the two event generating means from the relative displacements determined in step (e) that correspond to the two event generating means (g) determining the elapsed time between the temporally spaced events from the event occurrence times recorded in step (b); and (h) using the measured elapsed time between temporally spaced events from step (g) that corresponds to the two event generating means and the relative angular position of the two event generating means from step (f) to determine the velocity of the rotor.

* * * * *

UNITED STATES PATENT AND TRADEMARK OFFICE
CERTIFICATE OF CORRECTION

PATENT NO. : 6,958,599 B2
DATED : October 25, 2005
INVENTOR(S) : Peter Geoffrey Scotson et al.

It is certified that error appears in the above-identified patent and that said Letters Patent is hereby corrected as shown below:

Column 7,
Line 32, after "detecting" delete "the".
Line 43, after "respective" delete "sensed".

Column 9,
Line 20, delete "dining" and insert -- timing --.
Line 23, delete "nine" and insert -- time --.

Column 10,
Line 17, delete "(C)" and insert -- (c) --.

Signed and Sealed this

Twentieth Day of December, 2005

JON W. DUDAS
*Director of the United States Patent and Trademark Office*